(12) United States Patent
Jones et al.

(10) Patent No.: US 12,091,963 B2
(45) Date of Patent: Sep. 17, 2024

(54) PERFORMING A DOWNHOLE PRESSURE TEST

(71) Applicant: Halliburton Energy Services, Inc., Houston, TX (US)

(72) Inventors: Christopher Michael Jones, Katy, TX (US); Bin Dai, Spring, TX (US); James M. Price, The Woodlands, TX (US); Anthony Herman Van Zuilekom, Houston, TX (US); Darren George Gascooke, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/497,793

(22) Filed: Oct. 30, 2023

(65) Prior Publication Data

US 2024/0060415 A1 Feb. 22, 2024

Related U.S. Application Data

(63) Continuation of application No. 17/217,819, filed on Mar. 30, 2021, now Pat. No. 11,808,137, which is a
(Continued)

(51) Int. Cl.
*G01V 9/00* (2006.01)
*E21B 47/06* (2012.01)
(Continued)

(52) U.S. Cl.
CPC .............. *E21B 47/06* (2013.01); *E21B 47/07* (2020.05); *E21B 49/087* (2013.01); *G01V 9/00* (2013.01); *G01V 20/00* (2024.01); *E21B 2200/20* (2020.05)

(58) Field of Classification Search
CPC ........ E21B 47/06; E21B 49/088; E21B 49/10; E21B 47/12; E21B 47/07; E21B 49/087;
(Continued)

(56) References Cited

U.S. PATENT DOCUMENTS 5,703,286 A 12/1997 Proett et al.
7,011,155 B2 3/2006 Meister et al.
(Continued)

FOREIGN PATENT DOCUMENTS

EP 1396607 3/2004

OTHER PUBLICATIONS

International Search Report and Written Opinion for Application No. PCT/US2020/013182, dated May 7, 2020.
(Continued)

*Primary Examiner* — Brandi N Hopkins
(74) *Attorney, Agent, or Firm* — Benjamin Ford; C. Tumey Law Group PLLC

(57) ABSTRACT

A method and system for performing a pressure test. The method may include inserting a formation testing tool into a wellbore to a first location within the wellbore based at least in part on a figure of merit. The formation testing tool may include at least one probe, a pump disposed within the formation testing tool and connect to the at least one probe by at least one probe channel and at least one fluid passageway, and at least one stabilizer disposed on the formation testing tool. The method may further include activating the at least one stabilizer, wherein the at least one stabilizer is activated into a surface of the wellbore and performing the pressure test and determining at least one formation property from the pressure test.

20 Claims, 5 Drawing Sheets

Related U.S. Application Data continuation of application No. 16/297,465, filed on Mar. 8, 2019, now Pat. No. 11,008,853.

(51) Int. Cl.
  *E21B 47/07* (2012.01)
  *E21B 49/08* (2006.01)
  *G01V 20/00* (2024.01)

(58) Field of Classification Search
  CPC .... E21B 2200/20; G01V 9/00; G01V 99/005; G01V 20/00
  See application file for complete search history.

(56) References Cited

U.S. PATENT DOCUMENTS

| | | | |
|---|---|---|---|
| 7,765,862 B2 | 8/2010 | Flaum | |
| 2005/0268709 A1* | 12/2005 | McGregor | E21B 49/10 73/152.27 |
| 2011/0094733 A1 | 4/2011 | Proett | |
| 2011/0218736 A1 | 9/2011 | Pelletier | |
| 2013/0019672 A1 | 1/2013 | Hemsing | |
| 2014/0027112 A1 | 1/2014 | Irani et al. | |
| 2015/0013973 A1* | 1/2015 | Murphy | E21B 49/10 166/250.15 |
| 2015/0039230 A1* | 2/2015 | Proett | E21B 47/06 702/6 |
| 2015/0315903 A1 | 11/2015 | Abbassian et al. | |
| 2016/0305240 A1 | 10/2016 | Fox et al. | |

OTHER PUBLICATIONS

Proett, et al., Objectively Quantifying Wireline and LWD Pressure Test Quality, SPWLA 55th Annual Logging Symposium, May 2014.
Notice of Allowance for U.S. Appl. No. 17/186,246 dated Mar. 20, 2023.
Office Action Summary for U.S. Appl. No. 17/186,246 dated Aug. 29, 2022.
Final Office Action Summary for U.S. Appl. No. 17/186,246 dated Feb. 24, 2023.
Notice of Allowance for U.S. Appl. No. 16/297,465 dated Jan. 21, 2021.
Office Action Summary for U.S. Appl. No. 17/217,819 dated Aug. 30, 2022.
Final Office Action Summary for U.S. Appl. No. 17/217,819 dated Feb. 28, 2023.
Office Action Summary for U.S. Appl. No. 17/217,819 dated Jun. 22, 2023.
Notice of Allowance for U.S. Appl. No. 17/217,819 dated Sep. 19, 2023.

* cited by examiner

PERFORMING A DOWNHOLE PRESSURE TEST

CROSS REFERENCE TO RELATED APPLICATIONS

This application is a continuation of U.S. patent application Ser. No. 17/217,819, filed Mar. 30, 2021, Which is a continuation of U.S. patent application Ser. No. 16/297,465, filed Mar. 8, 2019 which are incorporated by reference herein in their entirety.

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility enhancement, production enhancement strategies, and reserve estimation. One technique for collecting relevant information involves pressure testing a reservoir of interest at any specified depth. There are a variety of different tools that may be used to perform the pressure test. Pressure test operations may be utilized to determine formation parameters at a specified depth.

Currently, methods and systems for pressure testing a formation are time consuming and inefficient. Additionally, current methods and systems do not identify locations that may not be acceptable for formation testing until after many pressure tests have been performed and have failed.

BRIEF DESCRIPTION OF THE DRAWINGS

These drawings illustrate certain aspects of some of the examples of the present disclosure, and should not be used to limit or define the disclosure.

DETAILED DESCRIPTION

This disclosure presents a method for operation a formation testing tool during a pressure test with as few as two drawdowns. By utilizing any number of partial tests and correction test with respect to buildup time and pressure test quality, the pressure test information is obtained in the shortest time all within predefined constraints already utilized for safety and tool operational constraints. Furthermore, this method is fully automated with optimal warnings for poor control. The method may utilize additional pressure tests to confirm pressure test repeatability and may be used to identify if a location is a bad pressure test location by the second partial pre-test thereby aborting any future testing at the specified location.

Figure 1:
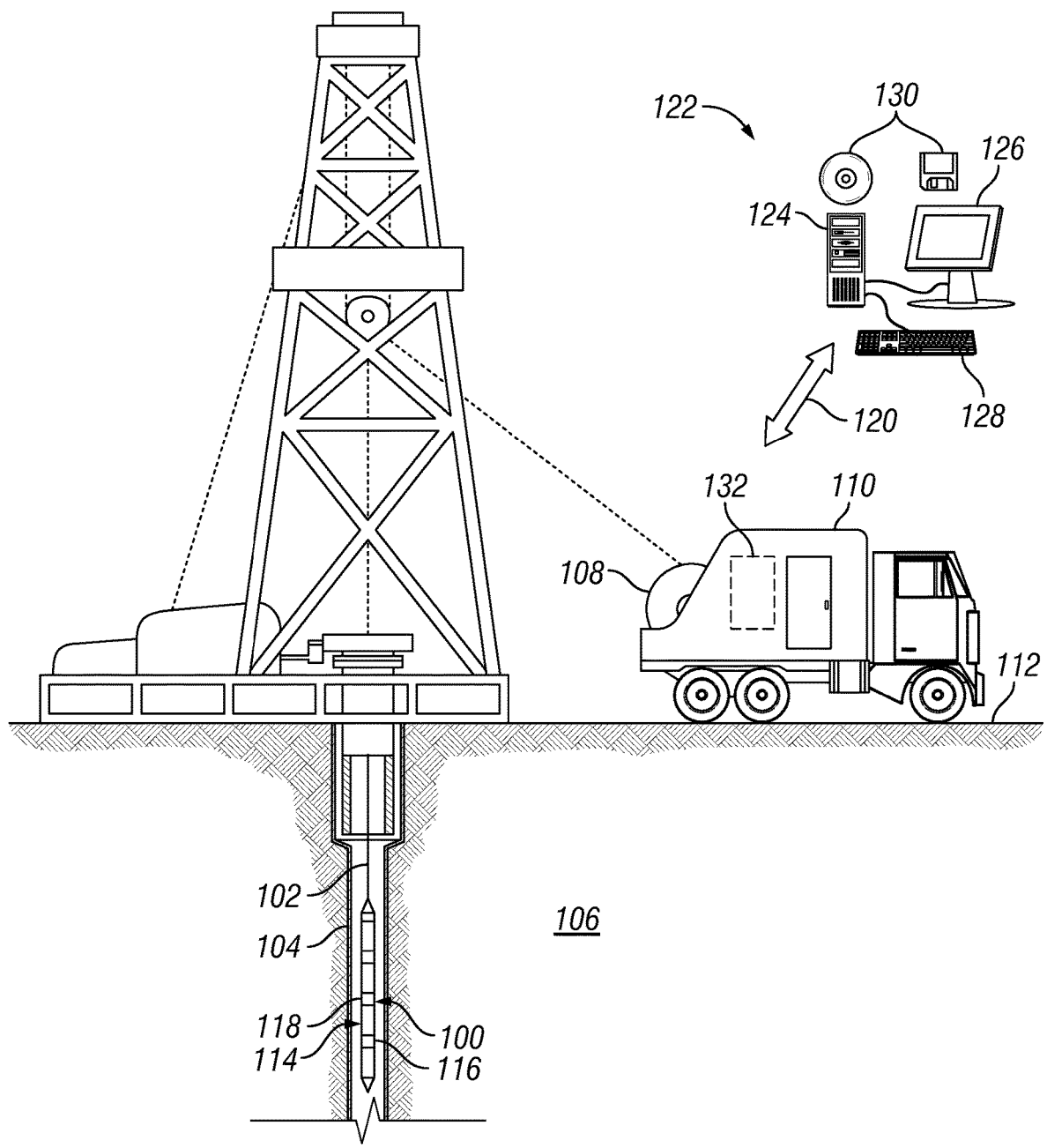
FIG. 1 is a schematic diagram of an example of a formation testing tool on a wireline.

FIG. 1 is a schematic diagram is shown of formation testing tool 100 on a conveyance 102. As illustrated, wellbore 104 may extend through subterranean formation 106. In examples, reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 1 shows a vertical or low inclination angle well, high inclination angle or horizontal placement of the well and equipment is also possible. It should further be noted that while FIG. 1 generally depicts a land-based operation, those skilled in the art will readily recognize that the principles described herein are equally applicable to subsea operations that employ floating or sea-based platforms and rigs, without departing from the scope of the disclosure.

As illustrated, a hoist 108 may be used to run formation testing tool 100 into wellbore 104. Hoist 108 may be disposed on a vehicle 110. Hoist 108 may be used, for example, to raise and lower conveyance 102 in wellbore 104. While hoist 108 is shown on vehicle 110, it should be understood that conveyance 102 may alternatively be disposed from a hoist 108 that is installed at surface 112 instead of being located on vehicle 110. Formation testing tool 100 may be suspended in wellbore 104 on conveyance 102. Other conveyance types may be used for conveying formation testing tool 100 into wellbore 104, including coiled tubing and wired drill pipe, for example. Formation testing tool 100 may include a tool body 114, which may be elongated as shown on FIG. 1. Tool body 114 may be any suitable material, including without limitation titanium, stainless steel, alloys, plastic, combinations thereof, and the like. Formation testing tool 100 may further include one or more sensors 116 for measuring properties of the fluid sample, reservoir fluid, wellbore 104, subterranean formation 106, or the like. In examples, formation testing tool 100 may also include a fluid analysis module 118, which may be operable to process information regarding fluid sample, as described below. Formation testing tool 100 may be used to collect fluid samples from subterranean formation 106 and may obtain and separately store different fluid samples from subterranean formation 106.

In examples, fluid analysis module 118 may include at least one a sensor that may continuously monitor a reservoir fluid. Such sensors include optical sensors, acoustic sensors, electromagnetic sensors, conductivity sensors, resistivity sensors, selective electrodes, density sensors, mass sensors, thermal sensors, chromatography sensors, viscosity sensors, bubble point sensors, fluid compressibility sensors, flow rate sensors. Sensors may measure a contrast between drilling fluid filtrate properties and formation fluid properties.

In examples, fluid analysis module 118 may be a gas chromatography analyzer (GC). A gas chromatography analyzer may separate and analyze compounds that may be vaporized without decomposition. Fluid samples from wellbore 104 may be injected into a GC column and vaporized. Different compounds may be separated due to their retention time difference in the vapor state. Analyses of the compounds may be displayed in GC chromatographs. In examples, a mixture of formation fluid and drilling fluid filtrate may be separated and analyzed to determine the properties within the formation fluid and drilling fluid filtrate.

Fluid analysis module 118 may be operable to derive properties and characterize the fluid sample. By way of example, fluid analysis module 118 may measure absorption, transmittance, or reflectance spectra and translate such measurements into component concentrations of the fluid sample, which may be lumped component concentrations, as described above. The fluid analysis module 118 may also measure gas-to-oil ratio, fluid composition, water cut, live fluid density, live fluid viscosity, formation pressure, and formation temperature. Fluid analysis module 118 may also be operable to determine fluid contamination of the fluid sample and may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, fluid analysis module 118 may include random access memory (RAM), one or more processing units, such as a central processing unit (CPU), or hardware or software control logic, ROM, and/or other types of nonvolatile memory.

Any suitable technique may be used for transmitting signals from the formation testing tool 100 to surface 112. As illustrated, a communication link 120 (which may be wired or wireless, for example) may be provided that may transmit data from formation testing tool 100 to an information handling system 122 at surface 112. Information handling system 122 may include a processing unit 124, a monitor 126, an input device 128 (e.g., keyboard, mouse, etc.), and/or computer media 130 (e.g., optical disks, magnetic disks) that can store code representative of the methods described herein. Information handling system 122 may act as a data acquisition system and possibly a data processing system that analyzes information from formation testing tool 100. For example, information handling system 122 may process the information from formation testing tool 100 for determination of fluid contamination. Information handling system 122 may also determine additional properties of the fluid sample (or reservoir fluid), such as component concentrations, pressure-volume-temperature properties (e.g., bubble point, phase envelop prediction, etc.) based on the fluid characterization. This processing may occur at surface 112 in real-time. Alternatively, the processing may occur downhole hole or at surface 112 or another location after recovery of formation testing tool 100 from wellbore 104. Alternatively, the processing may be performed by an information handling system in wellbore 104, such as fluid analysis module 118. The resultant fluid contamination and fluid properties may then be transmitted to surface 112, for example, in real-time.

It should be noted that in examples a gas chromatographer 132 may be disposed on surface 112 and analyze samples captures by formation testing tool 100. For example, fluid analysis module 118 may capture fluid samples and bring them to the surface 112 for analysis at the wellsite. As illustrated, gas chromatographer 132 may be disposed in vehicle 110. However, gas chromatographer 132 may be a standalone assembly that may be available at the wellsite. Additionally, information handling system 122 may be connected to gas chromatographer 132 through communication link 120. In examples, gas chromatographer 132 may operate and function as described above.

Figure 2:
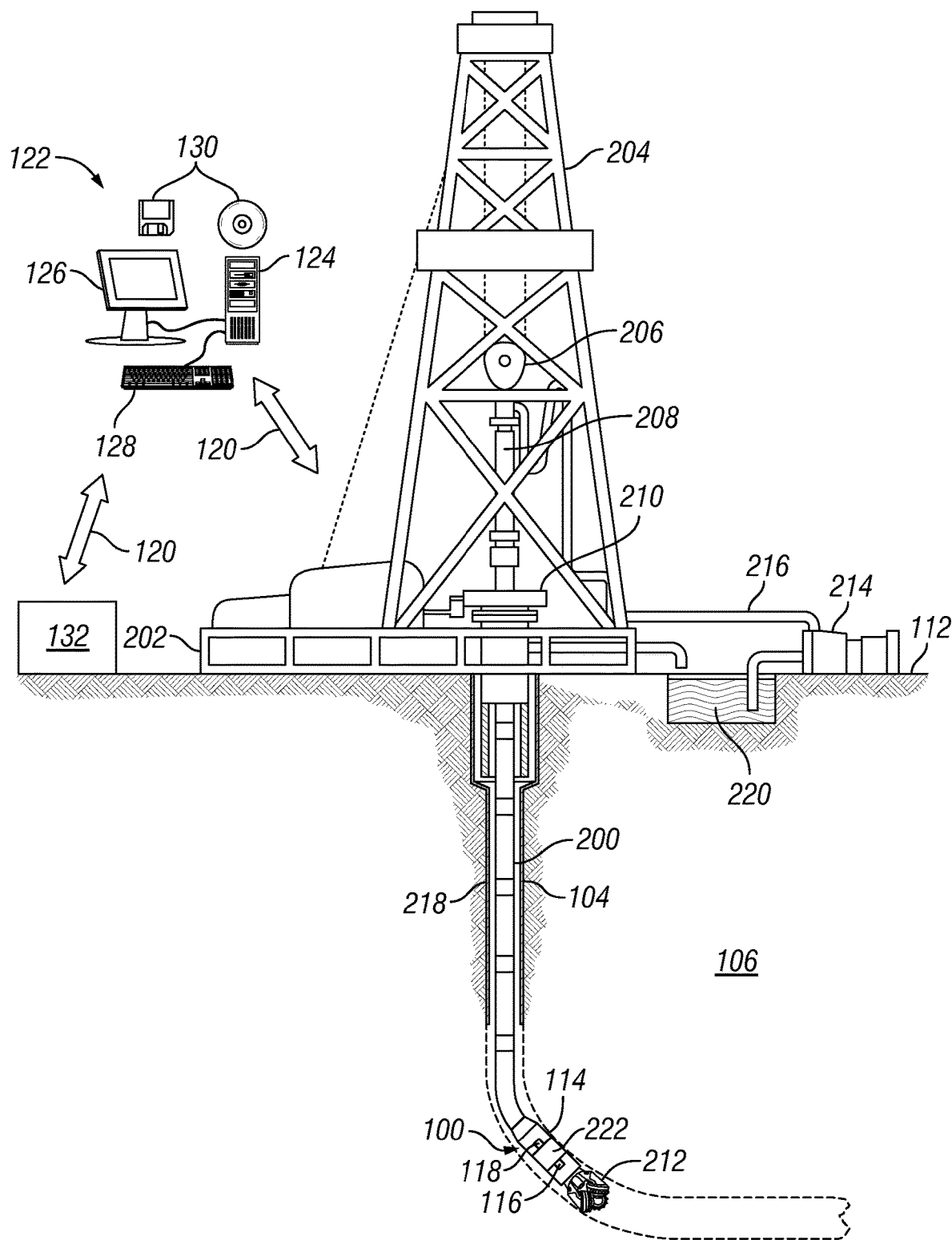
FIG. 2 is a schematic diagram of an example of the formation testing tool on a drill string.

Referring now to FIG. 2, FIG. 2 is a schematic diagram is shown of formation testing tool 100 disposed on a drill string 200 in a drilling operation. Formation testing tool 100 may be used to obtain a fluid sample, for example, a fluid sample of a reservoir fluid from subterranean formation 106. The reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 2 shows a vertical or low inclination angle well, high inclination angle or horizontal placement of the well and equipment is also possible. It should further be noted that while FIG. 2 generally depicts a land-based operation, those skilled in the art will readily recognize that the principles described herein are equally applicable to subsea operations that employ floating or sea-based platforms and rigs, without departing from the scope of the disclosure.

As illustrated, a drilling platform 202 may support a derrick 204 having a traveling block 206 for raising and lowering drill string 200. Drill string 200 may include, but is not limited to, drill pipe and coiled tubing, as generally known to those skilled in the art. A kelly 208 may support drill string 200 as it may be lowered through a rotary table 210. A drill bit 212 may be attached to the distal end of drill string 200 and may be driven either by a downhole motor and/or via rotation of drill string 200 from the surface 112. Without limitation, drill bit 212 may include, roller cone bits, PDC bits, natural diamond bits, any hole openers, reamers, coring bits, and the like. As drill bit 212 rotates, it may create and extend wellbore 104 that penetrates various subterranean formations 106. A pump 214 may circulate drilling fluid through a feed pipe 216 to kelly 208, downhole through interior of drill string 200, through orifices in drill bit 212, back to surface 112 via annulus 218 surrounding drill string 200, and into a retention pit 220.

Drill bit 212 may be just one piece of a downhole assembly that may include one or more drill collars 222 and formation testing tool 100. Formation testing tool 100, which may be built into the drill collars 22) may gather measurements and fluid samples as described herein. One or more of the drill collars 222 may form a tool body 114, which may be elongated as shown on FIG. 2. Tool body 114 may be any suitable material, including without limitation titanium, stainless steel, alloys, plastic, combinations thereof, and the like. Formation testing tool 100 may be similar in configuration and operation to formation testing tool 100 shown on FIG. 1 except that FIG. 2 shows formation testing tool 100 disposed on drill string 200. Alternatively, the sampling tool may be lowered into the wellbore after drilling operations on a wireline.

Formation testing tool 100 may further include one or more sensors 116 for measuring properties of the fluid sample reservoir fluid, wellbore 104, subterranean formation 106, or the like. The properties of the fluid are measured as the fluid passes from the formation through the tool and into either the wellbore or a sample container. As fluid is flushed in the near wellbore region by the mechanical pump, the fluid that passes through the tool generally reduces in drilling fluid filtrate content, and generally increases in formation fluid content. Formation testing tool 100 may be used to collect a fluid sample from subterranean formation 106 when the filtrate content has been determined to be sufficiently low. Sufficiently low depends on the purpose of sampling. For some laboratory testing below 10% drilling fluid contamination is sufficiently low, and for other testing below 1% drilling fluid filtrate contamination is sufficiently low. Sufficiently low also depends on the nature of the formation fluid such that lower requirements are generally needed, the lighter the oil as designated with either a higher GOR or a higher API gravity. Sufficiently low also depends on the rate of cleanup in a cost benefit analysis since longer pumpout times required to incrementally reduce the contamination levels may have prohibitively large costs. As previously described, the fluid sample may include a reservoir fluid, which may be contaminated with a drilling fluid or drilling fluid filtrate. Formation testing tool 100 may obtain and separately store different fluid samples from subterranean formation 106 with fluid analysis module 118. Fluid analysis module 118 may operate and function in the same manner as described above. However, storing of the fluid samples in the formation testing tool 100 may be based on the determination of the fluid contamination. For example, if the fluid contamination exceeds a tolerance, then the fluid sample may not be stored. If the fluid contamination is within a tolerance, then the fluid sample may be stored in the formation testing tool 100.

As previously described, information from formation testing tool 100 may be transmitted to an information handling system 122, which may be located at surface 112. As illustrated, communication link 120 (which may be wired or wireless, for example) may be provided that may transmit data from formation testing tool 100 to an information handling system 111 at surface 112. Information handling system 140 may include a processing unit 124, a monitor 126, an input device 128 (e.g., keyboard, mouse, etc.), and/or computer media 130 (e.g., optical disks, magnetic disks) that may store code representative of the methods described herein. In addition to, or in place of processing at surface 112, processing may occur downhole (e.g., fluid analysis module 118). In examples, information handling system 122 may perform computations to estimate clean fluid composition.

As previously described above, a gas chromatographer 132 may be disposed on surface 112 and analyze samples captures by downhole fluid sampling tool 100. For example, fluid analysis module 118 may capture fluid samples and bring them to the surface 112 for analysis at the wellsite. As illustrated, gas chromatographer 132 may be a standalone assembly that may be available at the wellsite. Additionally, information handling system 122 may be connected to gas chromatographer 132 through communication link 120. In examples, gas chromatographer 132 may operate and function as described above.

Figure 3:
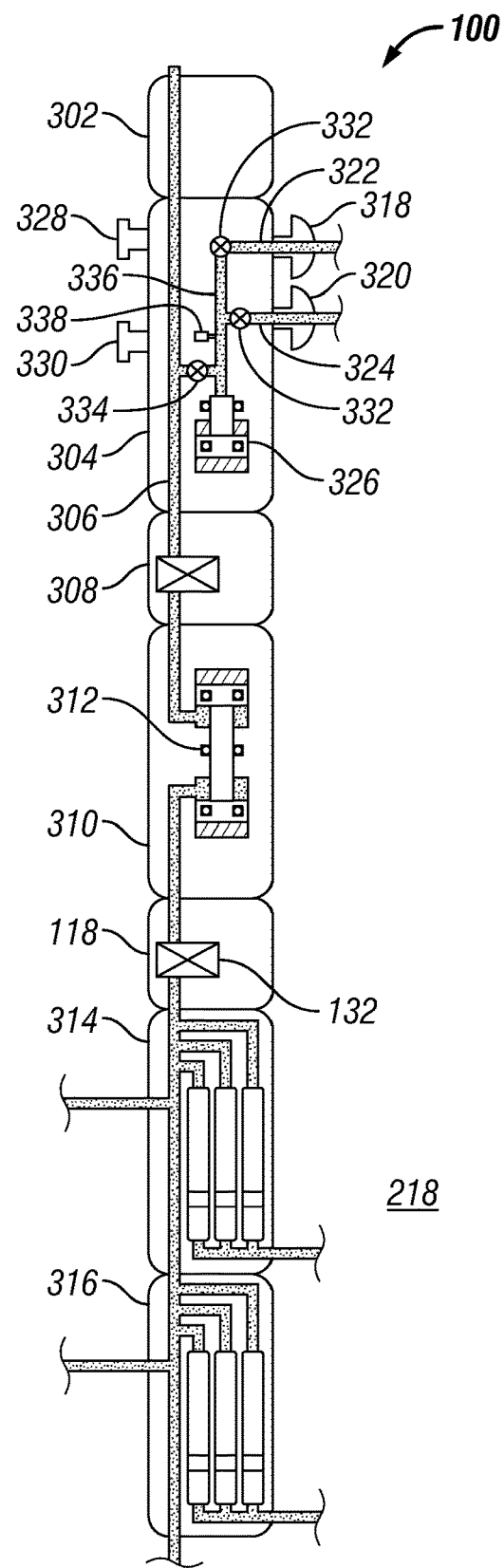
FIG. 3 is a schematic drawing of the formation testing tool.

FIG. 3 is a schematic of formation testing tool 100. In examples, formation testing tool 100 includes a power telemetry section 302 through which the tool communicates with other actuators and sensors 116 in drill string 200 or conveyance 102 (e.g., referring to FIGS. 1 and 2), and/or directly with a surface telemetry system (not illustrated). In examples, power telemetry section 302 may also be a port through which the various actuators (e.g., valves) and sensors (e.g., temperature and pressure sensors) in the formation testing tool 100 may be controlled and monitored. In examples, power telemetry section 302 includes a computer that exercises the control and monitoring function. In one example, the control and monitoring function is performed by a computer in another part of the drill string or wireline tool (not shown) or by information handling system 122 on surface 112 (e.g., referring to FIGS. 1 and 2).

In examples, formation testing tool 100 includes a dual probe section 304, which extracts fluid from the reservoir and delivers it to a channel 306 that extends from one end of formation testing tool 100 to the other. Without limitation, dual probe section 304 includes two probes 318, 320 which may extend from formation testing tool 100 and press against the inner wall of wellbore 104 (e.g., referring to FIG. 1). Probe channels 322, 324 may connect probes 318, 320 to channel 306. The high-volume bidirectional pump 312 may be used to pump fluids from the reservoir, through probe channels 322, 324 and to channel 306. Alternatively, a low volume pump 326 may be used for this purpose. Two standoffs or stabilizers 328, 330 hold formation testing tool 100 in place as probes 318, 320 press against the wall of wellbore 104. In examples, probes 318, 320 and stabilizers 328, 330 may be retracted when formation testing tool 100 may be in motion and probes 318, 320 and stabilizers 328, 330 may be extended to sample the formation fluids at any suitable location in wellbore 104. Other probe sections include focused sampling probes, oval probes, or packers.

In examples, channel 306 may be connected to other tools disposed on drill string 200 or conveyance 102 (e.g., referring to FIGS. 1 and 2). In examples, formation testing tool 100 may also include a quartz gauge section 308, which may include sensors to allow measurement of properties, such as temperature and pressure, of fluid in channel 306. Additionally, formation testing tool 100 may include a flow-control pump-out section 310, which may include a high-volume bidirectional pump 312 for pumping fluid through channel 306. In examples, formation testing tool 100 may include two multi-chamber sections 314, 316, referred to collectively as multi-chamber sections 314, 316 or individually as first multi-chamber section 314 and second multi-chamber section 316, respectively. Without limitation, formation testing tool 100 may also be used in pressure testing operations.

For example, during pressure testing operations, probes 318, 320 may be pressed against the inner wall of wellbore 104 (e.g., referring to FIG. 1). Pressure may increase at probes 318, 320 due to formation 106 (e.g., referring to FIG. 1 or 2) exerting pressure on probes 318, 320. As pressure rises and reaches a predetermined pressure, valves 332 opens so as to close equalizer valve 334, thereby isolating fluid passageway 336 from the annulus 218. In this manner, valve 332 ensures that equalizer valve 334 closes only after probes 318, 320 has entered contact with mudcake (not illustrated) that is disposed against the inner wall of wellbore 104. In examples, as probes 318, 320 are pressed against the inner wall of wellbore 104, the pressure rises and closes the equalizer valve in fluid passageway 336, thereby isolating the fluid passageway 336 from the annulus 218. In this manner, the equalizer valve in fluid passageway 336 may close before probes 318, 320 may have entered contact with the mudcake that lines the inner wall of wellbore 104. Fluid passageway 336, now closed to annulus 218, is in fluid communication with low volume pump 326.

As low volume pump 326 is actuated, formation fluid may thus be drawn through probe channels 322, 324 and probes 318, 320. The movement of low volume pump 326 lowers the pressure in fluid passageway 336 to a pressure below the formation pressure, such that formation fluid is drawn through probe channels 322, 324 and probes 318, 320 and into fluid passageway 336. The pressure of the formation fluid may be measured in fluid passageway 336 while probes 318, 320 serves as a seal to prevent annular fluids from entering fluid passageway 336 and invalidating the formation pressure measurement.

With low volume pump 326 in its fully retracted position and formation fluid drawn into fluid passageway 336, the pressure will stabilize and enable pressure transducers 338 to sense and measure formation fluid pressure. The measured pressure is transmitted to information handling system 122 disposed on formation testing tool 100 and/or it may be transmitted to the surface via mud pulse telemetry or by any other conventional telemetry means to an information handling system 122 disposed on surface 112.

During this interval, pressure transducers 338 may continuously monitor the pressure in fluid passageway 336 until the pressure stabilizes, or after a predetermined time interval. When the measured pressure stabilizes, or after a predetermined time interval, for example at 1800 psi, and is sensed by pressure transducer 338 the drawdown operation may be complete. Once complete, fluid for the pressure test in fluid passageway 336 may be dispelled from formation testing tool 100 through the opening and/or closing of valves 332 and/or equalizer valve 334 as low volume pump 326 returns to a starting position.

During formation pressure test, an automated safe pressure test parameters of drawdown volume, drawdown rate, and drawdown pressure may be calculated before and/or during the pressure test. These parameters require an initialization of formation testing tool 100 (e.g., referring to FIG. 1) and formation safe drawdown pressure limits, rate limits, and volume limits. Utilizing the Darcy Flow Equation these three parameters define a safe envelope. An initial test is started with average (or pre-determined) initial drawdown values for each input. If during the course of a drawdown operation any position of this envelop is exceeded the drawdown is aborted and the buildup allowed to proceed, the drawdown parameters are reduced by a predetermined factor (e.g., two times) and a new set of safe parameters (upper and lower limits) may be calculated using the Darcy Flow Equation. As mentioned above, all pressure tests may operate within a safe envelope, however, the operation may not be optimized with the safe envelope.

Current technology may utilize the Darcy Flow Equation to calculate an idealized optimized test with one long full pressure test and apply the idealized optimized test to a second full pressure test because more than two pressure tests are not possible, however, the set of two full pressure tests may be longer than a set of two partial buildups and one full optimized buildup. A partial buildup is defined as when the pressure measured in a pressure test does not reach a steady-state formation pressure. A steady-state is defined as the stability of the pressure reading not changing significantly over a pre-determined time interval (e.g., 1 psi/min). It should be noted that the idealized buildup may be based on unreliable data, and often the first drawdown contains artifacts that may skew the direction.

Figure 4:
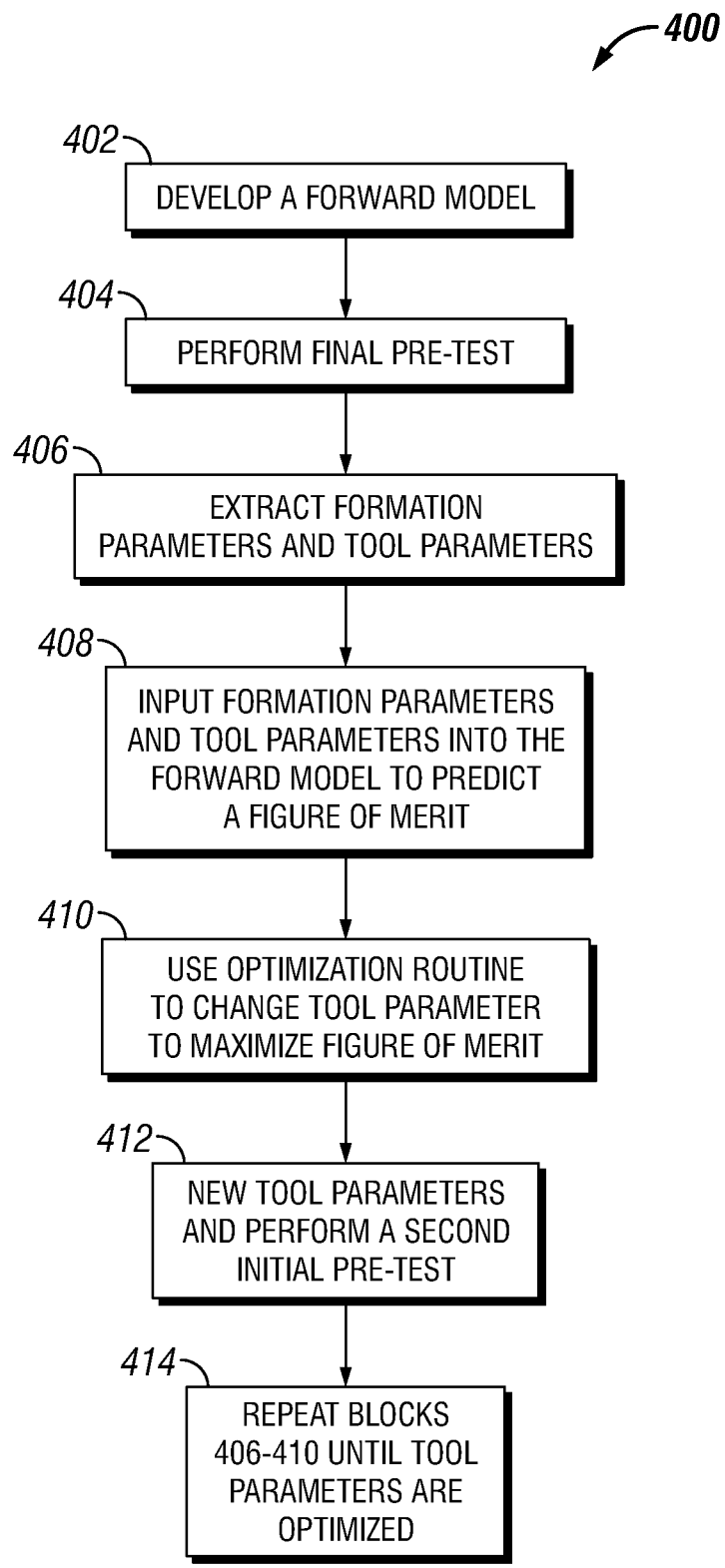
FIG. 4 is a flow chart for identify operational parameters for performing a pressure test.

FIG. 4 illustrates workflow 400, which may identify operational parameters for performing a pressure test. Workflow 400 may begin with block 402. In block 402, a forward model is developed. In examples, the forward model may start as a Gradient Boosted Regression (GBR) model, a K-Nearest Neighbor (knn) model, a multi-layer perceptron or artificial neural network model, a Gaussian Process Regression (GPR) model, a decision tree model, or ensemble of multiple models, and/or the like. Without limitation, the forward model may be developed from a number of known variables and may function to find a relation between the variables and a figure of merit from the corresponding pre-tests. The forward model may include known variables from a history database of pressure pre-test. For example, database may include a list of extracted formation parameters and list of tool parameters that may have been found in previous pressure pre-test. These variables may be used in the forward model so the forward model may find a relation between each known variable and corresponding pre-test figure of merit. Thus, the forward model may correlate tool historical pressure test drawdown volumes, drawdown rates, drawdown pressures, as well as other tool parameters (such as the probe type and radius), and the formation parameters (e.g., Mobility, hydrostatic pressure, and/or formation pressure) to a figure of merit, further discussed below. The model may either be constructed before pressure test operations with model parameters stored within information handling system 122 (e.g., referring to FIG. 1) that may calculate and calibrate an initial pressure test or during pressure test operations with a best match dataset to formation 106 (e.g., referring to FIG. 1). It should be noted that information handling system 122 may be disposed on formation testing tool 100 or at surface 112.

In block 404 personnel may perform an initial pre-test. During the initial pre-test, at least one drawdown operation may be performed according to a set of initial parameters within a safe envelop. The initial parameters of drawdown volume, drawdown pressure, and/or drawdown rate may be standard, pre-determined (for example by an offset well or analog formation) or calculated from one or more previous tests within the same formation. Additionally, the initial parameters may come from the forward model described above. In examples, the drawdown is terminated after a partial buildup. A partial buildup may be pre-set, or calculated according to the Darcy Equation, or predicted by the forward model described above as applied to at least one pressure test within the formation from the current or analog well. It should be note that the Darcy Equation may be used by personnel to determine a safety envelop in which the partial buildup may be performed.

Figure 5:
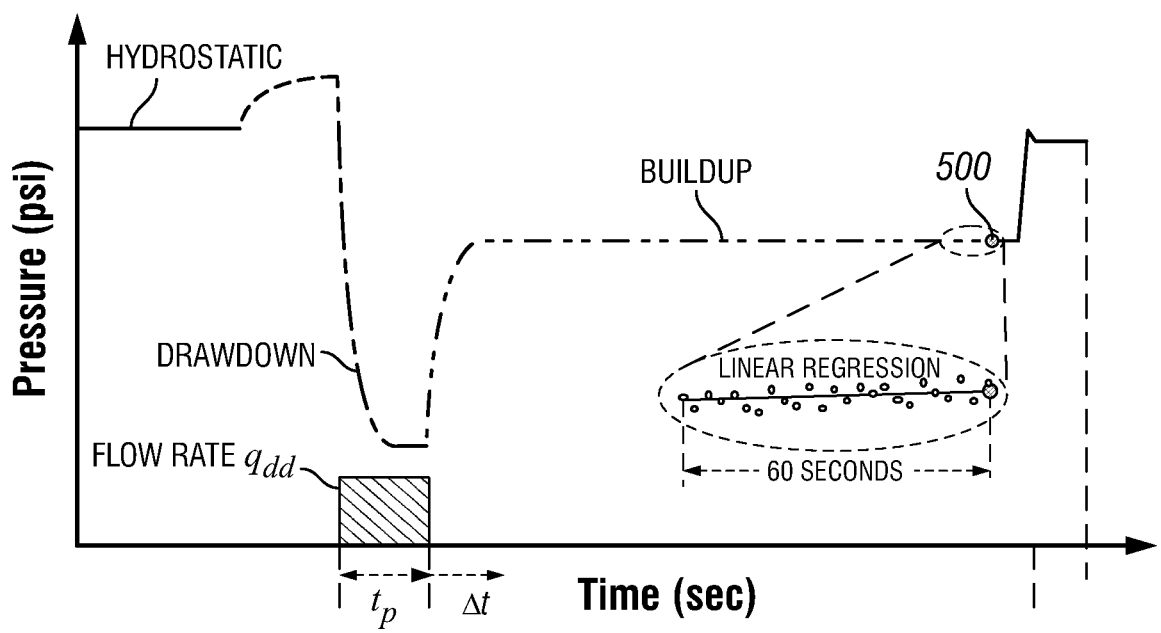
FIG. 5 is a flow chart for identifying stability and quality.

In examples, a partial build up may be defined as the length of time it may take during a build up to reach stability with a pre-identified quality for the pre-test measurement. Without limitation, during the build up two stability measurements may be made from a pressure gauge (not illustrated) during the buildup. The two stability measurements may be pressure stability and temperature stability. In FIG. 5, stability for a build-up is determined from slope 500 of a linear least-squares regression (LSR) line using the data from the last 60 seconds of a buildup operation. The same process is followed to obtain the temperature data. Ideally, the temperature stability would be zero because any transient in the pressure gauge temperature may contribute to a pressure error. Without limitation, temperature stability may be less than 0.001 F/sec range and may have little effect on the pressure measurement.

In examples, for pressure stability, slope 500 may depend on the formation mobility.

However, in examples this may not be the case as a result of the near wellbore invasion of mud filtrate or even formation testing tool 100 electromechanical characteristics. If the mudcake that forms on the wellbore were a perfect hydraulic seal, then the formation mobility may have the most significant influence on the pressure stability. However, even a tiny fractional leakage of the mud filtrate through the mudcake may influence buildup stability. Using standard linear LSR method, the following quantities may be determined:

$$b = \frac{\sum x_i y_i - \frac{1}{n}\sum x_i \sum y_i}{\sum x_i^2 - \frac{1}{n}(\sum x_i)^2} \quad (1)$$

$$a = \bar{y} - \bar{b} \cdot \bar{x} \quad (2)$$

where the pressure or temperature stability is represented by the linear equation, $$y = a + b \cdot x \quad (3)$$

and $y_i$ is the dependent variable of pressure or temperature and $x_i$ is the independent variable of time ($\bar{x}$ and $\bar{y}$ are the mean values of $x_i$ and $y_i$). It should be noted that this linear function may also be used to estimate the final pressure and temperature at the end of the buildup. The use of the LSR linear function to determine the final pressure and temperature reduces potential noise errors in the data. In downhole tools the noise source may be mechanical systems such as the hydraulic or electrical motors that are running. For logging while drilling tools, the borehole mud is normally circulating during a test. Pressure disturbances generated by a downhole mud pulser, surface mud pumps, or circulation turbulence may be a source of noise measured by the pressure gauge. In examples, the noise may exceed a standard deviation of ±1 psi. For this reason, the determination of the standard deviation is a quality control criterion that may be determined from the linear regression function as follows:

$$\sigma_y = \sqrt{\frac{\sum (y_i(a + b \cdot x_i))^2}{n-1}} \quad (4)$$

The quality of the drawdown pressure test is defined as a weighted average score of the different contributing variables (stability, mobility, radius of investigation, and supercharge) of a pressure test.

In block 406, during the initial pre-test, measurements of the formation parameters are taken. It should be noted that tool parameters may already be known from construction of formation testing tool 100 (e.g., referring to FIG. 1). These measurements may be used to optimize future pressure test. For example, measured formation parameters are fixed measurements that cannot be changed unless the formation changes naturally. Tool parameters are values that may be changed by personnel to increase the efficiency and measurement capability of formation testing tool 100 during pressure testing operations.

In block 408, the formation parameters and tool parameters obtained in block 406 serve as new input variables into the forward model from block 402 to predict a Figure of Merit. The Figure of Merit may be weighted according to pre-job planning. In examples, stability and quality as defined in block 404, may be two metrics that help define a figure of merit. The figure of merit may be expressed as seen below in the following equation:

$$\frac{\text{Quality}^{WQ} + Q\text{min}}{\text{Time}^{WT} + T\text{min}} \quad (5)$$

where the weight is a positive number and minimum quality or minimum time positive numbers.

The variables of Equation 5 are defined below. Quality is defined a Score found in the following method. In examples, a rating settings for Valid and the Range serve as the basis for the rating analysis to establish a Score. The Score ranges from 0 to 4 (i.e., lowest to highest) with a Score of 2 considered Valid. The range determines the lower and upper limits (i.e., 0-4) of the Score by scaling the Valid setting geometrically. The Score depends on whether an upper limit or lower limit over the range is desirable. For example, for the stability measurements and supercharging, a Value below the Valid setting is scored higher. The Score is geometrically scaled around 2 and depends on the Range and Valid criteria as follows:

$$\text{Value} = \text{Valid} * \text{Range}^{\left(1 - \frac{\text{Score}}{2}\right)} \quad (6)$$

$$\text{Score} = 2\left(1 - \frac{\log\left(\frac{|\text{Value}|}{\text{Valid}}\right)}{\log(\text{Range})}\right) \quad (7)$$

It should be noted that the absolute value is used for the Value to determine the Score. In examples, the stability could be negative, for scoring purposes the absolute value is used. For the mobility ($M_{sdd}$) and radius of investigation ($r_{inv}$), a value above the Valid setting is a higher score and geometrically scales as follows:

$$\text{Value} = \text{Valid} * \text{Range}^{\left(\frac{\text{Score}}{2} - 1\right)} \quad (8)$$

$$\text{Score} = 2\left(1 = \frac{\log\left(\frac{|\text{Value}|}{\text{Valid}}\right)}{\log(\text{Range})}\right) \quad (9)$$

The Score being limited between 4 and 0 uses the following logic: For measured values where the lower values are desirable (Stability and Supercharge); If the measured Value>Valid*Range then, Score=0 If the measured Value<Valid/Range then, Score=4 If Valid/Range≤Value≤Valid*Range then, Use Eq. 1. Where higher measured values are desirable (Mobility and Radius of Investigation). If the measured Value<Valid*Range then, Score=0; If the measured Value>Valid/Range then, Score=4; If Valid/Range≥Value≥Valid*Range then, Use Eq. 3.

The final scoring is determined from a weighted average of all quality control criterion scoring. For the final score, each quality criteria are given a weighting factor from 0 to 1 with 1, being the highest. The weighting factors $w_i$ determine the fraction that an individual Score, contributes to the final Score as shown below:

$$\text{Score} = \sum_{i=1,n}\left(\text{Score}_i \frac{w_i}{\sum_{i=1,n} w_i}\right) \quad (10)$$

Using the final Score, comments are determined using the following logic. Low Quality Value<0.5; Fair=0.5≤Value<1.5; Valid=1.5≤Value<2.5; Good=2.5≤Value<3.5; and High Quality=Value≥3.5.

Weight for Quality ("WQ") and Weight for Time ("WT") may range from 0 to 2 (or even higher) depending on how much emphasis the pre-job planning chooses to weight quality and/or time. For example, a 1 is chosen for Quality and a 0 is chosen for Time when the emphasis is strictly focused on the quality of the pre-test. Alternatively, a combination of 1 could be chosen for Quality, and WT=½ for Time to de-emphasize the build-up time contribution to the figure of merit. Other weighting examples can be chosen. $Q_{min}$ is defined as the minimum quality accepted by personnel and could range from 0 to as high as 2 or even 3. Time is defined as the length of time from the start of a buildup to and end of a buildup. Without limitation, other weighting examples may be chosen. $T_{min}$ is defined as the minimum time it takes for a buildup. It may range from (as low as) 0 or 30 sec, and up to 100 sec or more.

Block 410 optimizes the tool parameters while keeping the formation parameters held fixed. Using the forward model, a figure of merit is predicted. The optimization evolves by changing the tool parameters, subsequently predicting a new figure of merit, such that the figure of merit moves towards a maximum. For example, tool parameters may be input into the forward model of block 402 and the forward model may be optimized using gradient based algorithms, Bayesian Optimization, Simplex Optimization, and/or the like.

In examples, formation parameters and the tool parameters are used in the forward model from block 402 to predict the figure of merit with at least one parameter varied from the initial tool parameters. Utilizing algorithms above, tool parameters may be optimized. Tool parameters being optimized is defined as changing tool parameters from the initial pre-test in block 404 to configure formation testing tool 100 to improve the figure of merit described above. As described above, the modeled figure of merit may be calculated exactly for the first partial drawdown and the forward model from block 402 may be combined with the figure of merit for a second partial drawdown may produce a second modeled figure of merit. It should be noted that if the initial condition parameters are outside of the safe envelop condition and a second modeled parameter may be used instead that falls within the safe condition and instead of using the first drawdown and partial buildup. Without limitation two starting points within a safe envelop may be modeled. At least one third position is chosen from a combination of the first two. In examples, for combination is a reflection perpendicular to the multivariate line between the first two points forming a geometric multidimensional simplex method. The third point is combined with the first two making preferably by the geometric multidimensional simplex method, with a forth drawdown modeled. Subsequent drawdowns may be modeled in a similar fashion, until either the optimum merit function value is discovered within a tolerance, or a maximum number of iterations has been determined. The safe envelop may be used as a constraint for any geometric multidimensional simplex method. It should be noted that other methods other than the geometric multidimensional simplex method may be used to determine a drawdown set such as but not limited to nonlinear quazi-newtonian optimization.

Additionally, it should be noted that in block 410, parameters may be chosen or defined within a safety envelope to allow for safe pressure drawdown, safe partial buildup, safe pressure operations, and/or the like. These parameters may be related to the drawdown volume, drawdown pressure, and drawdown rate through the Darcy Equation, but used as the primary means of controlling pressure operations. A safety envelop are max and/or min parameters that may be used by formation testing tool 100 to perform pressure test operations.

In block 412, a second initial pre-test is performed based on optimization of tool parameters found with the forward model from block 410. The second initial pre-test may be performed as described above. During the second initial pre-test, a second partial buildup may be performed. Without limitation, the second partial buildup may be performed within the safety envelope found above in Block 410.

Without limitation, comparison of the first initial pre-test to the second initial pre-test may provide a characterization of the formation, reservoirs within the formation, and nearest neighbors. These characterizations may be added to the historical library of formation tests, described above, to develop a highly localized model of the area. As described above, the forward model may be used to form a secondary model that optimizes tool parameters, which may be applied to the second drawdown and partial buildups in order to iteratively refine the forward model within a tolerance or terminating after a fixed number of iterations.

In block 414, the process described in blocks 406 to 410 may be repeated optimization of tool parameters until pressure operations are not affected by the change in tool parameters. Additionally, in block 414, the first pre-test and second pre-test (or additional tests if performed) may be compared to determine if found formation parameters may be reliable. If the second pre-test produces a low figure of merit that may be similar to the first forward model figure of merit, the pressure test location may be abandoned as a difficult location to pressure test.

It should be note that if the second pre-test is outside a tolerance pre-determined by personnel, it may be determined that the formation may need additional partial pressure tests to determine formation parameters. Thus, subsequent test may be performed in accordance with block 404 block 412. It should be noted that this process may continue with as many pressure tests as necessary. The sequence of using the last pressure test response as compared to the actual response may continue until the subsequent pressure test fall within the pre-determined tolerance or until a limit has been reached. Additionally, a quality control pressure test may be performed to review all pre-test taken. It should be noted that a complete pressure test may qualify as the quality control pressure test.

As discussed above, the disclosed workflow 400 may utilize two pressure tests to determine a third where three or more pressure tests may be performed by formation testing tool 100. Workflow 400 makes use of partial buildups to rapidly assess a formation 106 (e.g., referring to FIG. 1 or 2). The method specifically utilized two quick partial buildups learn the formation in the context of historical pressure tested formations and map the optimal drawdown volume, drawdown pressure, and drawdown rate specially within the safe pressure test envelop. Further if the mapped space may be unusual with regards to a high residual in the mapping process, a warning may initiate that this formation type has not been encountered. Under these circumstances a third drawdown with partial buildup may be used to confirm formation 106 may be an outlier with respect to mapping. Further if the predicted pressure test quality for a third test is low (assuming the formation is well mapped) the location may be recognized as a difficult pressure test spot and an option may be taken to move. A quick forth drawdown and partial buildup may be used to confirm the pressure test spot is difficult. If the pressure test location is not determined to be difficult or an outlier (as defined above), then a forth partial buildup may be used to confirm the quality of the third test by forward modeling. If conventional repeat may be performed, it may be performed with repute formation parameters or next formation parameters. If the formation is difficult to learn, multiple partial pressure tests may be used, however, aborting the sequence after a set number of pressure tests may be optional. The partial buildup time may also be controlled as part of the method, although constrained to a minimum and maximum value. Previous zones and identified formation parameters within the previous zones may be used to supplement a current pressure test.

Improvements over current technology may be found in the accuracy and reliability of extracted formation parameters from a pressures test, namely mobility and formation pressure. As a result of this process, these parameters may be extracted more accurately and reliably in a shorter amount of time, thus saving rig time and reducing risk of tool issues such as sticking. This new approach improves the efficiency of formation pressure testing by combining machine learning algorithms and optimization to determine optimal sampling tool parameters in real-time. In doing so, a higher quality pressure transient analysis can be obtained with less operational tool-time and an improved estimate of formation properties.

The preceding description provides various embodiments of systems and methods of use which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

Statement 1. A method A method for performing a pressure test may comprise inserting a formation testing tool into a wellbore to a first location within the wellbore based at least in part on a figure of merit. The formation testing tool may include at least one probe, a pump disposed within the formation testing tool and connect to the at least one probe by at least one probe channel and at least one fluid passageway, and at least one stabilizer disposed on the formation testing tool. The method may further comprise activating the at least one stabilizer, wherein the at least one stabilizer is activated into a surface of the wellbore and performing the pressure test and determining at least one formation property from the pressure test.

Statement 2. The method of statement 1, further comprising forming the figure of merit from a forward model.

Statement 3. The method of statement 2, wherein the forward model includes a plurality of pressure pre-test variables.

Statement 4. The method of statement 3, wherein the plurality of pressure pre-test variables include at least one set of historical pressure test drawdown volumes set, drawdown rates set, drawdown pressures set, tool parameters set, and formation parameters set.

Statement 5. The method of statement 2, wherein the figure of merit is weighed by at least one of metrics of stability and quality.

Statement 6. The method of statement 5, wherein the quality is defined by a score and the score is identified by a range that identifies a validity of an ability to perform the pressure test.

Statement 7. The method of statement 2, further comprising updating the forward model with the at least one formation property from the pressure test.

Statement 8. The method of statement 7, further comprising updating the forward model for subsequent pressure test.

Statement 9. The method of statements 1 or 2, further comprising displaying the figure of merit on an information handling system.

Statement 10. The method of statements 1-3, further comprising performing the pressure test at a plurality of location in the wellbore.

Statement 11. A system for performing a formation fluid test may comprise a formation testing tool. The formation testing tool my comprise at least one probe, wherein the at least one probe is configured to be disposed in a mudcake along a surface of a wellbore, at least one stabilizer, wherein the at least one stabilizer is configured to be disposed against the surface of the wellbore, and an information handling system. The information handling system may be configured to create a figure of merit, activate the at least one stabilizer, and store one or more formation properties from a pressure test.

Statement 12. The system of statement 11, wherein the information handling system is further configured to form the figure of merit from a forward model.

Statement 13. The system of statement 12, wherein the forward model includes a plurality of pressure pre-test variables.

Statement 14. The system of statement 13, wherein the plurality of pressure pre-test variables include at least one set of historical pressure test drawdown volumes set, drawdown rates set, drawdown pressures set, tool parameters set, and formation parameters set.

Statement 15. The system of statement 12, wherein the figure of merit is weighed by at least one of metrics of stability and quality.

Statement 16. The system of statement 15, wherein the quality is defined by a score and the score is identified by a range that identifies a validity of an ability to perform the pressure test.

Statement 17. The system of statement 12, wherein the information handling system is further configured to update the forward model with the one or more formation properties from the pressure test.

Statement 18. The system of statement 17, wherein the information handling system is further configured to update the forward model for subsequent pressure test.

Statement 19. The system of statements 11, or 12, wherein the information handling system is further configured to display the figure of merit on a monitor.

Statement 20. The system of statements 11-13, wherein the information handling system is further configured to perform the pressure test at a plurality of location in the wellbore.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present embodiments are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for performing a pressure test comprising:
inserting a downhole tool into a wellbore to a first location within the wellbore based at least in part on a figure of merit, wherein the downhole tool includes:
at least one probe;
a pump disposed within the downhole tool and connect to the at least one probe by at least one probe channel and at least one fluid passageway; and
at least one stabilizer disposed on the downhole tool;
activating the at least one stabilizer, wherein the at least one stabilizer is activated into a surface of the wellbore; and
performing the pressure test within the wellbore; and
determining at least one formation property from the pressure test with an information handling system that is in communication with the downhole tool.

2. The method of claim 1, further comprising forming a figure of merit from a forward model based at least in part on the at least on formation property.

3. The method of claim 2, wherein the forward model includes a plurality of pressure pre-test variables.

4. The method of claim 3, wherein the plurality of pressure pre-test variables include at least one set of historical pressure tests, drawdown volumes set, drawdown rates set, drawdown pressures set, tool parameters set, and formation parameters set.

5. The method of claim 2, wherein the figure of merit is weighed by at least one of metrics of stability and quality.

6. The method of claim 5, wherein the quality is defined by a score and the score is identified by a range that identifies a validity of an ability to perform the pressure test.

7. The method of claim 2, further comprising updating the forward model with the at least one formation property from the pressure test.

8. The method of claim 1, wherein the information handling system is disposed at surface.

9. The method of claim 1, wherein the information handling system is disposed on the downhole tool.

10. The method of claim 1, wherein the information handling system is disposed at least partially at surface and at least partially on the downhole tool.

11. A system for performing a formation fluid test comprising:
a downhole tool comprising:
at least one probe, wherein the at least one probe is configured to be disposed in a mudcake along a surface of a wellbore;
at least one stabilizer, wherein the at least one stabilizer is configured to be disposed against the surface of the wellbore; and
an information handling system configured to:
identify a first set of tool parameters;
perform a first test with the downhole tool to identify one or more formation fluid properties;
input the one or more formation properties and the first set of tool parameters into a forward model for a first pre-test;
identifying a figure of merit form the forward model; and
change the first set of tool parameters to a second set of tool parameters for a second pre-test based at least in part on the figure of merit.

12. The system of claim 11, wherein the information handling system is disposed at surface.

13. The system of claim 12, wherein the figure of merit is weighed by at least one of metrics of stability and quality.

14. The system of claim 13, wherein the quality is defined by a score and the score is identified by a range that identifies a validity of an ability to perform the pressure test.

15. The system of claim 11, wherein the forward model includes a plurality of pressure pre-test variables.

16. The system of claim 15, wherein the plurality of pressure pre-test variables include at least one set of historical pressure tests, drawdown volumes set, drawdown rates set, drawdown pressures set, tool parameters set, and formation parameters set.

17. The system of claim 11, wherein the information handling system is disposed on the downhole tool.

18. The system of claim 11, wherein the information handling system is disposed at least partially at surface and at least partially on the downhole tool.

19. The system of claim 11, wherein the herein the forward model is a Gaussian Process Regression model, Gradient Boosted Regression model, K nearest neighbor's model, support vector machine model, multi-layer perceptron, or artificial neural network model.

20. The system of claim 11, wherein the forward model includes historic pressure test from an analog well.

* * * * *